H. KEMPINSKI.
WINDOW DISPLAY.
APPLICATION FILED OCT. 6, 1910.
995,607.
Patented June 20, 1911.
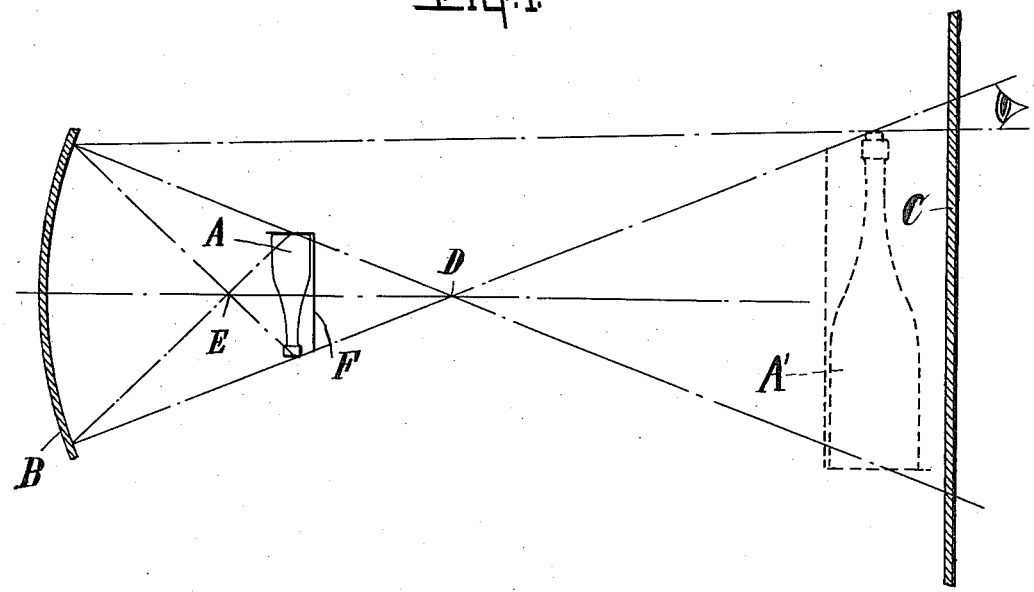
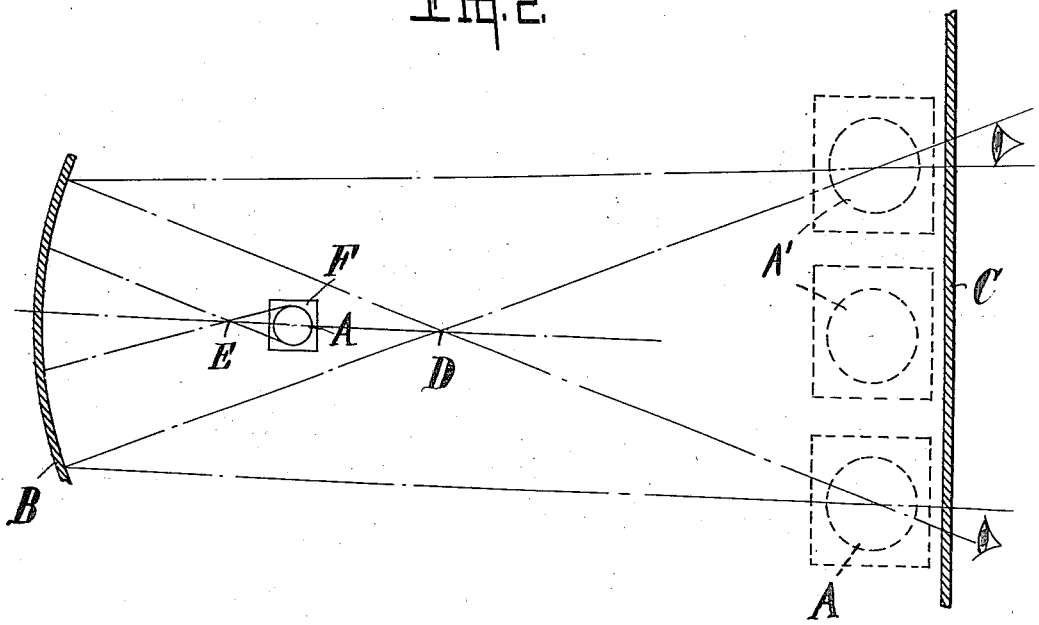

UNITED STATES PATENT OFFICE.

HANS KEMPINSKI, OF BERLIN, GERMANY, ASSIGNOR TO CHARLES W. SAALBURG, OF NEW YORK, N. Y.

WINDOW-DISPLAY.

995,607.  Specification of Letters Patent.  Patented June 20, 1911.

Application filed October 6, 1910. Serial No. 585,574.

*To all whom it may concern:*

Be it known that I, HANS KEMPINSKI, a subject of the King of Prussia, residing at Berlin, in the Kingdom of Prussia and German Empire, have invented a new and useful Improvement in Window-Displays, of which the following is a specification.

My invention relates to window displays of that class in which the article or articles exhibited for show are visible to the spectator under certain conditions only, that is to say, from certain points outside of the window, while the article or articles are invisible from other points.

My invention consists in arranging in the rear of and at a distance from the window glass a concave mirror, locating the article or articles to be shown at a place between the said mirror and the window glass and positioning the article and the mirror so that the mirror is in the field of sight of the outside spectators, whereas the article or articles to be shown are invisible and only their reflected or optical image is visible to the outside spectator if the latter occupies a certain position in front of the window outside thereof.

The invention will be readily understood with reference to the accompanying drawing, in which—

Figure 1 is a vertical section of the arrangement constructed in accordance with my invention, and Fig. 2 a horizontal sectional view of the same.

For example, a single bottle A is shown in the drawing as the article to be exhibited in the window, but of course articles or objects of any other kind, such as flowers, victuals, clothes, tools or any other articles, may be displayed.

B designates the concave mirror and C the window pane.

The bottle A is located in inverted position between the optical center or vertex D of the mirror face and its focus E. Some provision must be made for instance a sheet F and arranged in front of the bottle to conceal the latter from the observer's eyes.

The mirror B produces a magnified image A' of the bottle in upright position between the center D and the window pane C. This image will be seen by the outside spectator when his eyes are in the path of the light beams reflected by the mirror B and crossing each other at D. When the spectator moves on the street toward or from the window pane so far away that none of the beams reflected from the mirror can fall into his eyes the image of the bottle will disappear out of his sight, but when he moves back to his first position the image will appear again.

A display of the kind produces particular effects in the windows of stores and factories.

I claim:

1. A window display, comprising an object to be displayed, a concave mirror in the rear of said object to reflect an image of the latter toward the window and a device to conceal the said object itself from the observer outside of the window.

2. A window display, comprising an object to be displayed, a concave mirror located in the rear of said object, so as to bring the latter between the focus and the vertex of the mirror, the latter thereby reflecting an image of the object toward the window, and a sheet in front of the object, for the purpose of concealing the said object from the observer outside of the window.

In testimony whereof I have signed my name to this specification in the presence of two subscribing witnesses.

HANS KEMPINSKI.

Witnesses:
BERNHARD GRENTZ,
RICHARD KINDLER.